United States Patent [19]

Nagaoka

[11] Patent Number: 5,729,389
[45] Date of Patent: Mar. 17, 1998

[54] OBJECTIVE LENS SYSTEM FOR MICROSCOPES

[75] Inventor: Toshiyuki Nagaoka, Tokyo, Japan

[73] Assignee: Olympus Optical Co., Ltd., Tokyo, Japan

[21] Appl. No.: 662,820

[22] Filed: Jun. 12, 1996

Related U.S. Application Data

[63] Continuation of Ser. No. 079,282, Jun. 21, 1993, abandoned.

[30] Foreign Application Priority Data

Jun. 22, 1992 [JP] Japan ...................... 4-185754

[51] Int. Cl.$^6$ .............. G02B 3/00; G02B 21/02
[52] U.S. Cl. .............................. 359/654; 359/661
[58] Field of Search ...................... 359/654, 661, 359/660

[56] References Cited

U.S. PATENT DOCUMENTS

| | | | |
|---|---|---|---|
| 4,762,403 | 8/1988 | Hattori | 359/654 |
| 4,880,298 | 11/1989 | Takada | 359/654 |
| 4,998,807 | 3/1991 | Uzawa et al. | 359/654 |
| 5,059,005 | 10/1991 | Kawano | 359/661 |
| 5,184,251 | 2/1993 | Tsuchida et al. | 359/654 |
| 5,235,464 | 8/1993 | Tsuchida | 359/654 |
| 5,359,456 | 10/1994 | Kikuchi | 359/654 |
| 5,623,370 | 4/1997 | Ueda et al. | 359/654 |

FOREIGN PATENT DOCUMENTS 62-31816  2/1987  Japan .
2-3189608  8/1991  Japan .

*Primary Examiner*—David C. Nelms
*Assistant Examiner*—Jordan M. Schwartz
*Attorney, Agent, or Firm*—Cushman Darby & Cushman IP Group of Pillsbury Madison & Sutro LLP

[57] ABSTRACT

An objective lens system for microscopes composed of only two lens components each of which is a radial type graded refractive index lens component, and having a numerical aperture of at least 0.2 and favorably corrected aberrations.

20 Claims, 4 Drawing Sheets

OBJECTIVE LENS SYSTEM FOR MICROSCOPES

This is a continuation of application Ser. No. 08/079,282, filed on Jun. 21, 1993, which was abandoned.

BACKGROUND OF THE INVENTION a) Field of the Invention

The present invention relates to an objective lens system for microscopes which uses graded refractive index lens components, in particular, graded refractive index lens component of the so called radial type which varies a refractive index in the radial direction.

b) Description of the Prior Art

Objective lens systems for microscopes have aberrations which must be corrected sufficiently favorably and, at the same time, which satisfy certain requirements which unavoidably limit the freedom of correction of the aberrations. In order to prevent a collision between the objective lens systems and specimens, for example, the objective lens systems of microscopes must have long working distances. Further, the objective lens systems for microscopes must have a total length within a certain predetermined range when one of these objective lens systems is mounted on one and the same revolver. Furthermore, the objective lens systems for a microscope must have a large numerical aperture for obtaining a high resolution. In order to correct aberrations sufficiently favorably while satisfying these requirements, the objective lens systems for microscopes inevitably have complicated compositions, thereby posing important problems which are related to manufacturing costs and allowances thereof.

For solving these problems, it is known to use graded refractive index lens components of the radial type to provide a higher freedom for correction of the aberrations than that available with homogenous lens components.

As a conventional example of objective lens systems for microscopes which use the radial type graded refractive index lens components there is known an objective lens system disclosed by Japanese Patent Kokai Publication No. Sho 62-31,816. However, this objective lens system for microscopes uses as many as three radial type graded refractive index lens components, and is therefore undesirable from viewpoints of manufacturing cost and allowance thereof. Further, an objective lens system for microscopes disclosed by Japanese Patent Kokai Publication No. Hei 3-189,608 is known as an objective lens system which is composed of two lens components: one being the axial type which has a refractive index distribution in a direction along an optical axis and the other being the radial type. However, the numerical aperture of this objective lens system is 0.11 and not large. Further, it is conceivable to use aspherical lens components in objective lens system for microscopes. However, the aspherical lens components have no capability to correct Patzval's sums and chromatic aberration by themselves. Therefore it is ineffective to use aspherical lens components to reduce remarkably the number of lens components disposed in the objective lens system of a microscope.

SUMMARY OF THE INVENTION

A primary object of the present invention is to provide an objective lens system for a microscope which has a numerical aperture of 0.2 or larger, consists of a small number of lens components, can be manufactured at a low cost and has favorably corrected aberrations.

The objective lens system for a microscope according to the present invention is characterized in that it consists, in order from the object side, of a first lens component and a second lens component, each of which is the so-called radial type graded refractive index lens component having a refractive index distribution in the radial direction from an optical axis expressed by the following formula:

$$N(r) = N_{00} + N_{10} r^2 + N_{20} r^4 + \ldots$$

wherein the reference symbol r represents a distance as measured from the optical axis in the radial direction, the reference symbol $N_{00}$ designates a refractive index of the graded refractive index lens component as measured on an optical axis thereof, and the reference symbols $N_{10}$, $N_{20}$, ... denote refractive index distribution coefficients of the second, fourth, ... orders respectively.

Since it is necessary for objective lens systems for microscopes to have aberrations corrected sufficiently favorably while satisfying various requirements which are related to working distances, numerical apertures and so on, the objective lens systems unavoidably comprise large numbers of lens component, have complicated compositions, and require high manufacturing costs as well as strict manufacturing allowances. However, the present invention has succeeded in providing an objective lens system for a microscope which consists only of two lens components and satisfies the requirements described above. It is difficult, by using two homogenous lens components, to correct aberrations sufficiently favorably, in particular, to correct a Petzval's sum and chromatic aberration which are impotant for determing imaging performance of an objective lens system. For this reason, the objective lens system for microscopes according to present invention uses graded refractive index lens components of the radial type which have a refractive index distribution in the radial direction from an optical axis. Since the radial type graded refractive index lens components have refractive indices of media, these lens components make it possible to correct a Petzval's sum and chromatic aberration by themselves and provide freedom for correction of aberrations which is not available with homogenous lens components.

Now, description will be made of a concrete method for correcting aberrations in an objective lens system for microscopes by using the radial type graded refractive index lens components.

In order to obtain an objective lens system for microscopes which consists, in order from the object side, of a first lens component having a positive refractive power and a second lens component having a positive refractive power, and is configured so as to have a numerical aperture of at least 0.2, it is necessary to converge a diverging light bundle coming from an object point especially by the first lens component. For this purpose, the first lens component must have a refractive power stronger than that of the second lens component. It is therefore desirable that the objective lens system for microscopes according to the present invention satisfies the following condition (1):

$$\phi_1/\phi_2 > 1 \tag{1}$$

wherein the reference symbols $\phi_1$ and $\phi_2$ represent refractive powers of the first lens component and the second lens component respectively.

When the objective lens system for microscopes according to the present invention satisfies the condition (1), the first lens component thereof can sufficiently converge a light bundle coming from an object point. If the condition (1) is not satisfied, the first lens component will have too weak a refractive power and can hardly converge sufficiently the light bundle coming from the object point, thereby undesirably making it impossible to enlarge a numerical aperture of the objective lens system for microscopes.

When the refractive power of the first lens component is strengthened as described above in the objective lens system according to the present invention, the first lens component tends to produce aberrations in amounts larger than those of aberrations which are to be produced by the second lens component. As a result, a Petzval's sum and chromatic aberration must be corrected by the radial type graded refractive index lens component which is adopted as the first lens component.

It is known that a Petzval's sum PS of the radial type graded refractive index lens component is expressed by the following formula (a):

$$PS = \phi_S/N_{00} + \phi_M/N_{00}^2 \qquad (a)$$

wherein the reference symbols $\phi_S$ and $\phi_M$ represent a refractive power of surface and a refractive power of medium respectively of the radial type graded refractive index lens component. The refractive power of surface of the graded refractive index lens component means a total sum of refractive powers of surfaces of a homogenous lens component which has the same shape as that of the graded refractive index lens component and a refractive index of $N_{00}$, whereas the refractive power of medium of the graded refractive index lens component means a refractive power which is calculated on an assumption that the graded refractive index lens component has a planar surface of incidence and a planar surface of emergence both perpendicular to the optical axis without changing the thickness thereof as measured on the optical axis, and is approximated by the following formula (b):

$$\phi_M = -2N_{10}d \qquad (b)$$

wherein the reference symbol d represents thickness of the radial type graded refractive index lens component.

Since the denominator of the second term is squared in the formula (a) mentioned above, the radial type graded refractive index lens component can have a Petzval's sum of a value smaller than that of a Petzval's sum of a homogenous lens component which has the same refractive power as that of the graded refractive index lens component.

Since it is desirable to configure the first lens component so as to have a strong refractive power in the objective lens system for microscopes according to the present invention as described above, a Petzval's sum is apt to be produced remarkably in the positive direction. In the objective lens system for microscopes according to the present invention, it is therefore possible to correct the Petzval's sum produced by the first lens component by imparting the positive refractive power to the first lens component which is used as the lens component disposed on the object side.

Further, as is judged from the formula (b), the condition (2) shown below must be satisfied for imparting a positive refractive power to a medium of the radial type graded refractive index lens component:

$$N_{10} < 0 \qquad (2)$$

When the condition (2) is satisfied by the radial type graded refractive index lens component which is disposed on the object side in the objective lens system according to the present invention, the medium of this lens component has the positive refractive power, thereby making it possible to configure the graded refractive index lens component so as to produce a Petzval's sum which is smaller than that to be produced by a homogenous lens component having the same refractive power as that of the graded refractive index lens component. If the radial type graded refractive index lens component does not satisfy the condition (2), the medium of the graded refractive index lens component will have a refractive power of a negative value, whereby the graded refractive index lens component will undesirably produce a larger Petzval's sum.

In the next place, paraxial axial color which is produced by the first lens component can be corrected as described below in the objective lens system for microscopes according to the present invention:

It is known that paraxial axial color which is to be produced by a radial graded refractive index lens component is expressed by the following formula (c):

$$PAC = K(\phi_S/V_{00} + \phi_M/V_{10}) \qquad (c)$$

wherein the reference symbol K represents a coefficient which is dependent on a height of ray and an angle of a final paraxial ray, and the reference symbols $V_{00}$ and $V_{10}$ designate constants which are expressed by the formulae shown below respectively:

$$V_{00} = (N_{00d} - 1)/(N_{00F} - N_{00C})$$

$$V_{10} = N_{10d}/(N_{10F} - N_{10C})$$

wherein the reference symbols $N_{00d}$, $N_{00F}$ and $N_{00C}$ represent refractive indices as measured on the optical axis for the d-line, F-line and C-line respectively, the reference symbols $N_{10d}$, $N_{10F}$, $N_{10C}$ designate refractive index distribution coefficients $N_{10}$ for the d-line, F-line and C-line respectively. As is understood from the formula (c) mentioned above, it is possible to vary the paraxial axial color to be produced by the radial type graded refractive index lens component by changing a value of $V_{10}$.

Since it is desirable that the medium of the first lens component has the positive refractive power for correcting Petzval's sum in the objective lens system according to the present invention, it is desirable for reducing the value of the paraxial axial color PAC expressed by the formula (c) that the first lens component satisfies the following condition (3):

$$V_{00} < V_{10} \text{ or } V_{10} < 0 \qquad (3)$$

When the first lens component satisfies the condition (3), it is possible to configure this lens component so as to produce paraxial axial color in an amount smaller than that of the paraxial axial color to be produced by the homogenous lens component having the same refractive power as that of the radial type graded refractive index lens component. If the condition (3) is not satisfied, the first lens component will undesirably produce paraxial axial color in a large amount.

When the first lens component is configured so as to satisfy the conditions (2) and (3) described above, in the objective lens system according to the present invention, it is possible to favorably correct a Petzval's sum and paraxial axial color which are important especially for correcting aberrations in an objective lens system for microscopes. For correcting these aberrations more effectively, it is necessary that the refractive power $\phi_M$ has a value large to a certain degree in the formula (b). For this reason, it is desirable for the objective lens system for microscopes according to the present invention that the first lens component satisfy the following condition (4):

$$|N_{10}/f^2| > 0.1 \times 10^{-5} \quad (4)$$

wherein the reference symbol f represents a focal length of the objective lens system as a whole.

When the first lens component satisfies the above-mentioned condition (4) in the objective lens system according to the present invention, the refractive power $\phi_M$ of medium has a value large to a certain degree, thereby making it possible to correct a Pezval's sum and paraxial axial color. If the condition (4) is not satisfied, the refractive power of the medium of the first lens component will be weak, thereby making it impossible to correct a Petzval's sum and longitudinal chromatic aberration.

In preparation of a material for a graded refractive index lens component, there is a certain limit in the enlargement of $N_{10}$. When this point is taken into consideration, it is desirable, for sufficient correction of a Petzval's sum and paraxial axial color in the objective lens system according to the present invention, that the radial type graded refractive index lens component satisfies not only the condition (4) but also the following condition (5) which defines the thickness d of the lens component:

$$d/f > 0.1 \quad (5)$$

When the first lens component has thickness d which satisfies the condition (5), its medium can have a sufficient refractive power, thereby making it possible to correct a Petzval's sum and paraxial axial color sufficiently favorably. Though the conditions (2) through (5) described above are adopted for the first lens component, it is more desirable that the second lens component also satisfy these conditions (2) through (5).

Further, in the objective lens system for a microscope according to the present invention which has the large numerical aperture of 0.2 or larger, negative spherical aberration is apt to be produced remarkably by the first lens component having particularly strong positive refractive power. Therefore, it is desirable to correct this negative spherical aberration by producing positive spherical aberration with the medium of the graded refractive index lens component used as the first lens component. For producing positive spherical aberration with the medium of the radial type graded refractive index lens component, it is desirable that the radial graded refractive index lens component to be used as the first lens component satisfy the following condition (6):

$$N_{20} > 0 \quad (6)$$

When the radial type graded refractive index lens component satisfies the above-mentioned condition (6), it is possible to produce positive spherical aberration by the medium of this lens component, whereby the negative spherical aberration produced by the first lens component can be corrected favorably. If the condition (6) is not satisfied, negative spherical aberration will undesirably be produced by the medium of the radial type graded refractive index lens component.

As is understood from the foregoing description, it is important for the objective lens system for a microscope according to the present invention to correct aberrations, especially a Petzval's sum, paraxial axial color and spherical aberration, by the first lens component. In order to correct these aberrations at the same time, it is necessary to take into consideration a ratio between refractive powers of surface and medium as well as shapes of surfaces of the first lens component and so on. Since correction of the Petzval's sum and paraxial axial color is largely dependent on relationship between the refractive power of surface and that of the medium, it is necessary to design the objective lens system taking this relationship sufficiently into consideration.

Let us represent a total sum of a refractive power of surface $\phi_S$ and a refractive power of medium $\phi_M$ by $\phi$ ($\phi = \phi_S + \phi_M$) and designate a ratio of the refractive power of medium relative to the total sum by a ($a = \phi_M/\phi$). Then, the formula (a) and the formula (c) mentioned above give the following formulae (a') and (c') which express relations of a Petzval's sum PS and paraxial axial color PAC relative to the refractive power of medium:

$$PS = \phi\{(1-N_{00})a + N_{00}\}/N_{00}^2 \quad (a')$$

$$PAC = \phi\{(V_{00}-V_{10})a + V_{10}\}/V_{00}V_{10} \quad (c')$$

The relations of PS and PAC relative to the ratio of refractive power of medium which are expressed by the above-mentioned formulae (a') and (c') respectively are visualized in FIG. 7, wherein the ordinate represents PS or PAC and the abscissa represents a.

As is judged from FIG. 7 and the formula (a'), it is considered that a ratio between refractive powers of media $a_{PS}\{a_{PS} = N_{00}/(N_{00}-1)\}$ exists within a range of approximately 2 to 3.5 when PS is equal to 0 since $N_{00}$ is within a range of approximately 1.4 to 2 due to characteristics of the materials selected for the radial type graded refractive index lens components. From this fact, it is desirable that a ratio between the refractive powers of media $a_{PAC}\{a_{PAC} = V_{10}/(V_{10}-V_{00})\}$ exists within a range of approximately 0.5 to 5 when PAC is equal to 0 in order to correct a Petzval's sum and paraxial axial color at the same time by using radial type graded refractive index lens components. When $V_{00}$ is within a range of approximately 20 to 90 due to the characteristics of the graded refractive index lens components and the first lens component satisfies the above-mentioned condition (3), it is desirable to satisfy the following condition (7) in order that the radial type graded refractive index lens components satisfy the existing range of $0.5 < a_{PAC} < 5$:

$$-0.05 < 1/V_{10} < 1/V_{00} \quad (7)$$

when the radial type graded refractive index lens components satisfy the above-mentioned condition (7), it is possible to make the existing range of $a_{PS}$ nearly coincident with that of $a_{PAC}$, and correct a Petzval's sum and paraxial axial color at the same time. If the condition (7) is not satisfied, it will be impossible to correct the Petzval's sum and paraxial axial color at the same time.

In order to correct the Petzval's sum and paraxial axial color at the same time as described above, it is desirable that the condition (7) is satisfied and that the ratio a between of refractive powers has a value larger than 1. Further, since the first lens component has $\phi_S + \phi_M > 0$, it is desirable that the first lens component satisfy the following condition (8):

$$\phi_S < 0 \quad (8)$$

That is to say, it is desirable that the first lens component have a shape of a concave lens component in order to correct the Petzval's sum and paraxial axial color at the same time in the objective lens system for microscopes according to the present invention. If the first lens component has a shape of a convex lens component, $\phi_S$ will be larger than 0 and a will be within a range of 0<a<1 whereby it will be impossible to correct the Petzval's sum and paraxial axial color at the same time.

For correcting spherical aberration, it is desirable to configure the first lens component so as to have a shape of a meniscus lens component having a concave surface on the object side so that the first lens component will produce negative spherical aberration in an amount as small as possible. When the first lens component has such a shape, it is possible to reduce a refracting angle for the marginal ray incident on the first lens component, thereby reducing an amount of the negative spherical aberration to be produced. When the first lens component has a shape having a convex surface on the object side, it will be difficult to correct the negative spherical aberration.

As is understood from the foregoing description, it is desirable to configure the first lens component so as to have a shape of a negative meniscus lens component having a concave surface on the object side for correcting the Petzval's sum, paraxial axial color and spherical aberration at the same time in the objective lens system for microscopes according to the present invention.

For correcting offaxial aberrations such as lateral chromatic aberration and distortion in the objective lens system for microscopes according to the present invention, it is desirable to dispose the second lens component which has the positive refractive power at a locations on the image side of a point at which the offaxial principal ray intersects with the optical axis when an entrance pupil is located at infinite distance. That is to say, not only the Petzval's sum, paraxial axial color and spherical aberration but also the offaxial aberrations such as lateral chromatic aberration and distortion can be corrected by disposing the first lens component and the second lens component symmetrically with regard to the above-mentioned point.

DETAILED DESCRIPTION OF THE PREFERRED EMBODIMENTS

Figure 1:
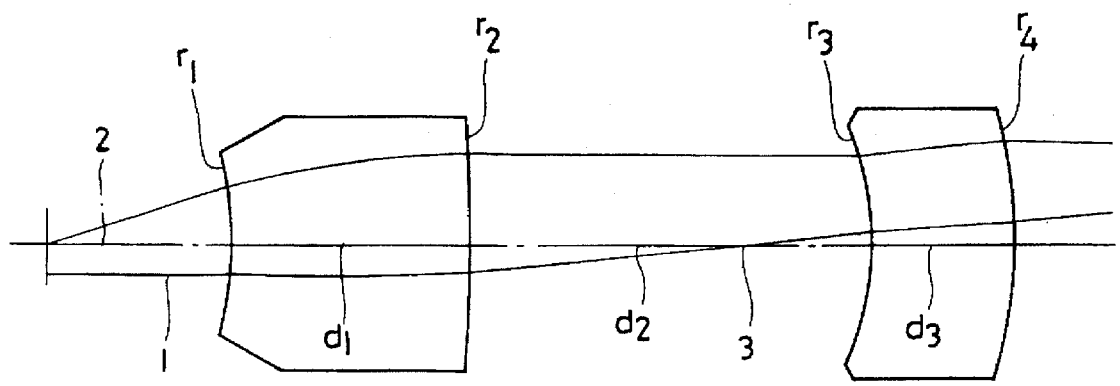
FIG. 1 through FIG. 3 show sectional views illustrating compositions of a first embodiment through a third embodiment of the objective lens system for a microscope according to the present invention.

Now, the objective lens system for microscopes according to the present invention will be described more detailedly below with reference to the preferred embodiments illustrated in the accompanying drawings and given in the form of the following numerical data:

EMBODIMENT 1 f=16.44 mm, NA=0.299, WD=8.24 mm,
$\beta$=10x
$r_1$=−15.1794
$d_1$=10.5682 (graded refractive index lens 1)
$r_2$=−96.4600
$d_2$=17.7068
$r_3$=−13.0488
$d_3$=6.3648 (graded refractive index lens 2)
$r_4$=−22.0762 graded refractive index lens 1 (1st lens)

|  | $N_{00}$ | $N_{10}$ | $N_{20}$ |
| --- | --- | --- | --- |
| d line | 1.74320 | −0.54303 × 10$^{-2}$ | 0.74268 × 10$^{-5}$ |
| C line | 1.73865 | −0.54209 × 10$^{-2}$ | 0.74095 × 10$^{-5}$ |
| F line | 1.75372 | −0.54524 × 10$^{-2}$ | 0.74672 × 10$^{-5}$ | graded refractive index lens 2 (2nd lens)

|  | $N_{00}$ | $N_{10}$ | $N_{20}$ |
| --- | --- | --- | --- |
| d line | 1.74320 | −0.18057 × 10$^{-2}$ | 0.24012 × 10$^{-5}$ |
| C line | 1.73865 | −0.18001 × 10$^{-2}$ | 0.23947 × 10$^{-5}$ |
| F line | 1.75372 | −0.18188 × 10$^{-2}$ | 0.24165 × 10$^{-5}$ |

$\phi_1/\phi_2$=10.86
$|N_{10}/f^2|$=2.01×10$^{-5}$ (1st lens), 0.67×10$^{-5}$ (2nd lens)
d/f=0.6428 (1st lens), 0.3872 (2nd lens)
$V_{00}$=49.31 (1st lens), 49.31 (2nd lens)
$V_{10}$=172.49 (1st lens), 96.56 (2nd lens)
$\phi_S$=−0.039 (1st lens), −0.016 (2nd lens)
$1/V_{10}$=0.0058 (1st lens), 0.0104 (2nd lens)
$1/V_{00}$=0.0203 (1st lens), 0.0203 (2nd lens)

EMBODIMENT 2 f=8.82 mm, NA=0.487, WD=3.04 mm,
$\beta$=−20x
$r_1$=−6.2632
$d_1$=7.8328 (graded refractive index lens 1)
$r_2$=−31.3844
$d_2$=14.0511
$r_3$=−110.0147
$d_3$=3.6105 (graded refractive index lens 2)
$r_4$=91.0789 graded refractive index lens 1 (1st lens)

|  | $N_{00}$ | $N_{10}$ | $N_{20}$ |
| --- | --- | --- | --- |
| d line | 1.74320 | −0.12849 × 10$^{-1}$ | 0.27236 × 10$^{-4}$ |
| C line | 1.73865 | −0.12826 × 10$^{-1}$ | 0.27181 × 10$^{-4}$ |
| F line | 1.75372 | −0.12901 × 10$^{-1}$ | 0.27363 × 10$^{-4}$ | graded refractive index lens 2 (2nd lens)

|  | $N_{00}$ | $N_{10}$ | $N_{20}$ |
| --- | --- | --- | --- |
| d line | 1.65800 | −0.40865 × 10$^{-2}$ | 0.25173 × 10$^{-4}$ |
| C line | 1.65451 | −0.40786 × 10$^{-2}$ | 0.25123 × 10$^{-4}$ |
| F line | 1.66599 | −0.41049 × 10$^{-2}$ | 0.25291 × 10$^{-4}$ |

$\phi_1/\phi_2$=8.0
$|N_{10}/f^2|$=16.52×10$^{-5}$ (1st lens), 5.25×10$^{-5}$ (2nd lens)
d/f=0.8881 (1st lens), 0.4094 (2nd lens)
$V_{00}$=49.31 (1st lens), 57.33 (2nd lens)
$V_{10}$=172.34 (1st lens), 155.19 (2nd lens)
$\phi_S$=−0.082 (1st lens) , −0.013 (2nd lens)

$1/V_{10}$=0.0058 (1st lens), 0.0064 (2nd lens)

$1/V_{00}$=0.0203 (1st lens), 0.0174 (2nd lens)

EMBODIMENT 3 f=4.36 mm, NA=0.700, WD=1.44 mm,

β=40x $r_1$=−4.3845

$d_1$=8.5290 (graded refractive index lens 1)

$r_2$=−19.0683

$d_2$=6.7184

$r_3$=16.1966

$d_3$=7.4428 (graded refractive index lens 2)

$r_4$=9.8443 graded refractive index lens 1 (1st lens)

|  | $N_{00}$ | $N_{10}$ | $N_{20}$ | $N_{30}$ |
|---|---|---|---|---|
| d line | 1.74330 | −0.15316 × 10⁻¹ | −0.29035 × 10⁻⁵ | 0.35506 × 10⁻⁶ |
| C line | 1.73875 | −0.15299 × 10⁻¹ | −0.29010 × 10⁻⁵ | 0.35452 × 10⁻⁶ |
| F line | 1.75382 | −0.15355 × 10⁻¹ | −0.29094 × 10⁻⁵ | 0.35632 × 10⁻⁶ | graded refractive index lens 2 (2nd lens)

|  | $N_{00}$ | $N_{10}$ | $N_{20}$ | $N_{30}$ |
|---|---|---|---|---|
| d line | 1.74330 | −0.11779 × 10⁻² | 0.33710 × 10⁻⁴ | 0.26552 × 10⁻⁶ |
| C line | 1.73875 | −0.11758 × 10⁻² | 0.33656 × 10⁻⁴ | 0.26511 × 10⁻⁶ |
| F line | 1.75382 | −0.11829 × 10⁻² | 0.33835 × 10⁻⁴ | 0.26647 × 10⁻⁶ |

$\phi_1/\phi_2$=59.67

$|N_{10}/f^2|$=80.57×10⁻⁵ (1st lens), 6.20×10⁻⁵ (2nd lens)

d/f=1.9562 (1st lens), 1.7071 (2nd lens)

$V_{00}$=49.31 (1st lens), 49.31 (2nd lens)

$V_{10}$=270.99 (1st lens), 166.25 (2nd lens)

$\phi_s$=−0.098 (1st lens), −0.015 (2nd lens)

$1/V_{10}$=0.0037 (1st lens), 0.0060 (2nd lens)

$1/V_{00}$=0.0203 (1st lens), 0.0203 (2nd lens)

wherein the reference symbols $r_1$, $r_2$, . . . represent radii of curvature on the surfaces of the respective lens components, and the reference symbols $d_1$, $d_2$, . . . designate thicknesses of the respective lens components and an airspace reserved therebetween.

The first embodiment has a composition illustrated in FIG. 1. Speaking concretely, the first embodiments consists of two lens components, i.e., a first lens component having a positive refractive power and a second lens component having a positive refractive power which are disposed in order from the object side, and has a magnification of 10x and an NA of approximately 0.3. This objective lens system is configured so as to have the large NA owing to a fact that radial type graded refractive index lens components are used as the first lens component and the second lens component, and the lens system is configured so as to satisfy the condition (1). Further, since each of the first lens component and the second lens component satisfies the conditions (2), (3), (4) and (5), a Petzval's sum and paraxial axial color are corrected favorably in the objective lens system. Furthermore, the Petzval's sum, paraxial axial color and spherical aberration can be corrected favorably at the same time by configuring the first lens component having the positive refractive power so as to satisfy the conditions (6), (7) and (8), and have a shape of a negative meniscus lens component having a concave surface on the object side.

Figure 4:
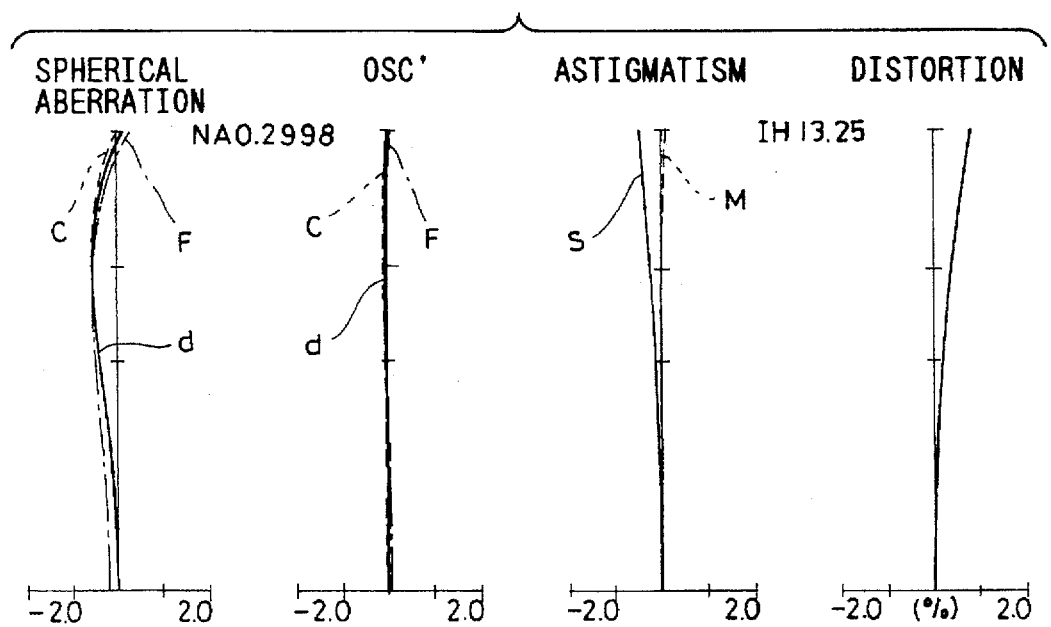
FIG. 4 through FIG. 6 show curves illustrating aberration characteristics of the first through third embodiment of the present invention.

Moreover, the offaxial aberrations are also corrected favorably by disposing the second lens component having the positive refractive power symmetrically with the first lens component with regard to a point 3 at which the offaxial principal ray 1 intersects with the optical axis 2. The first embodiment has aberration characteristics illustrated in FIG. 4.

Figure 2:
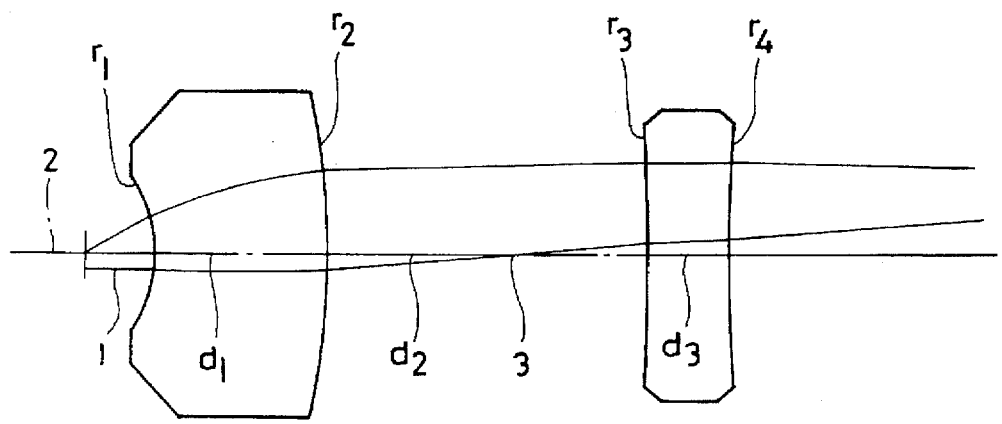
Figure 5:
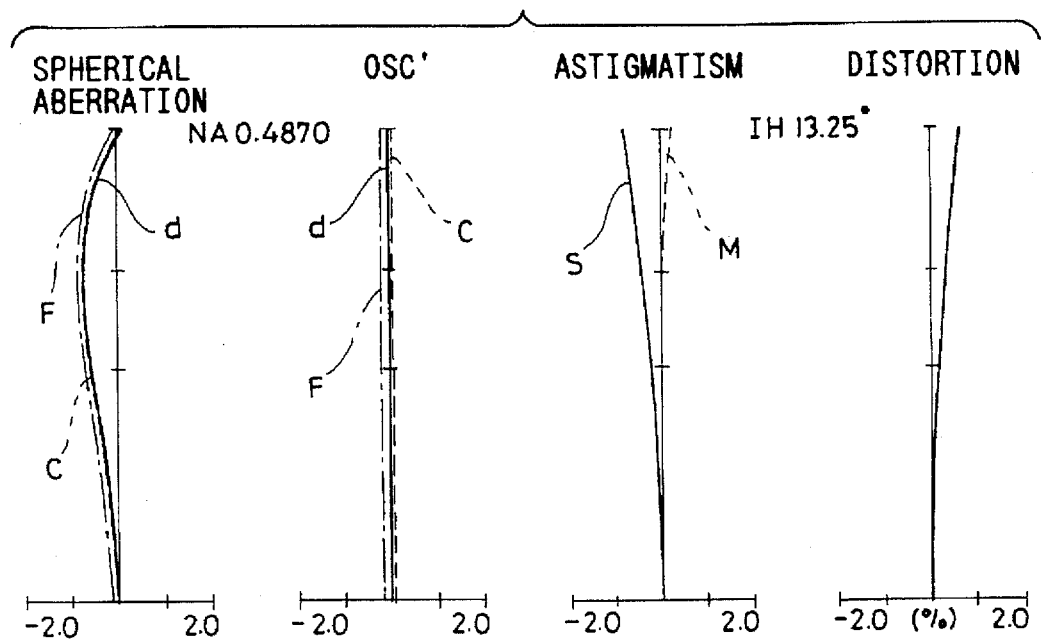

The second embodiment has a composition illustrated in FIG. 2, wherein the objective lens system for microscopes according to the present invention consists of two lens components, i.e., a first lens component having a positive refractive power and a second lens component having a positive refractive power which are disposed in order from the object side, and has a magnification of 20x and a numerical aperture of approximately 0.49. Used as the first lens component and the second lens component of this objective lens system are graded refractive index lens components, and the lens system is configured so as to satisfy the condition (1) for obtaining an objective lens system having the large numerical aperture. Further, each of the first lens component and the second lens component is configured so as to satisfy the conditions (2) through (5), and the first lens component having the positive refractive power is designed so as to satisfy the conditions (6) through (8). Furthermore, effects similar to those of the first embodiment are obtained by selecting, for the first lens component, a shape of a negative meniscus lens component having a concave surface on the object side and disposing the second lens component having the positive refractive power symmetrically with the first lens component with regard to a point 3 at which an offaxial principal ray 1 intersects with an optical axis 2 when an entrance pupil is located at infinite distance. Though the second embodiment has a magnification and a numerical aperture which are higher and larger than those of the first embodiment, aberrations are corrected favorably in the second embodiment. The second embodiment has aberration characteristics illustrated in FIG. 5.

Figure 3:
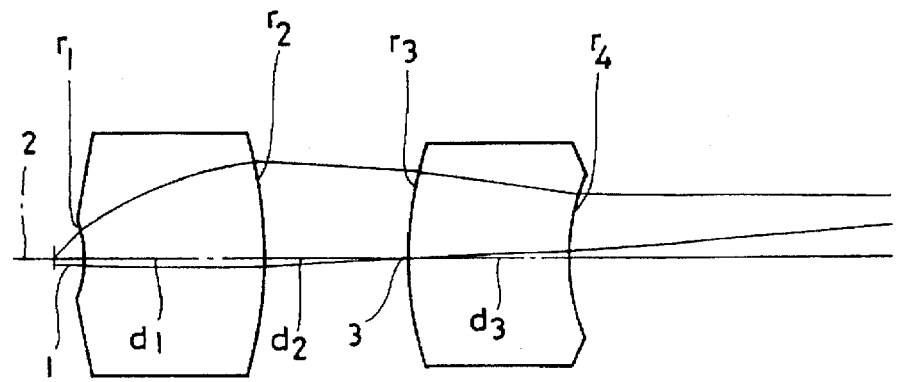
Figure 6:
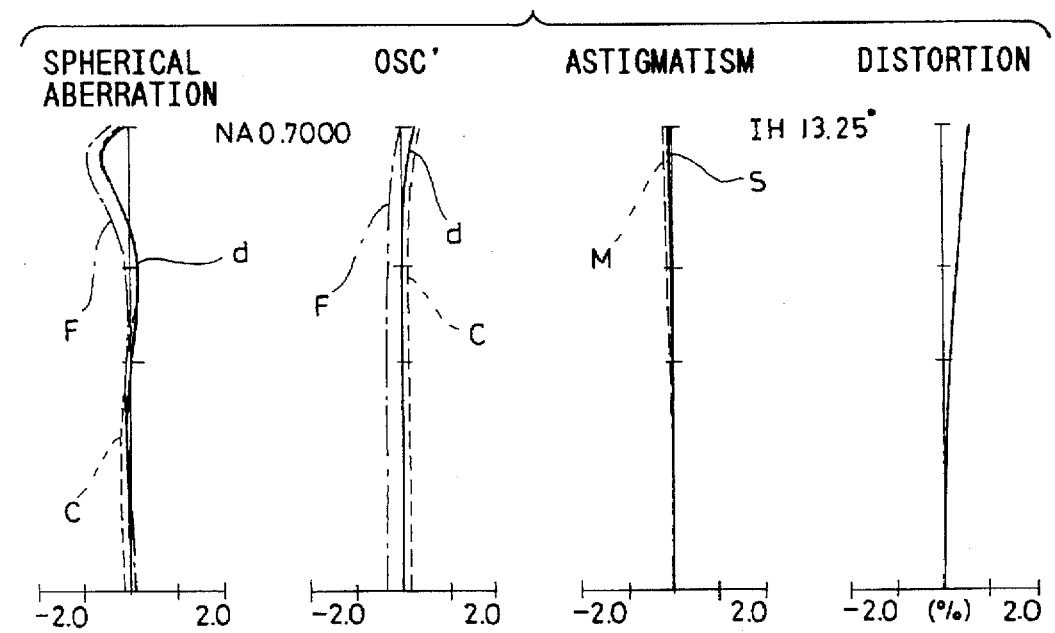
Figure 7:
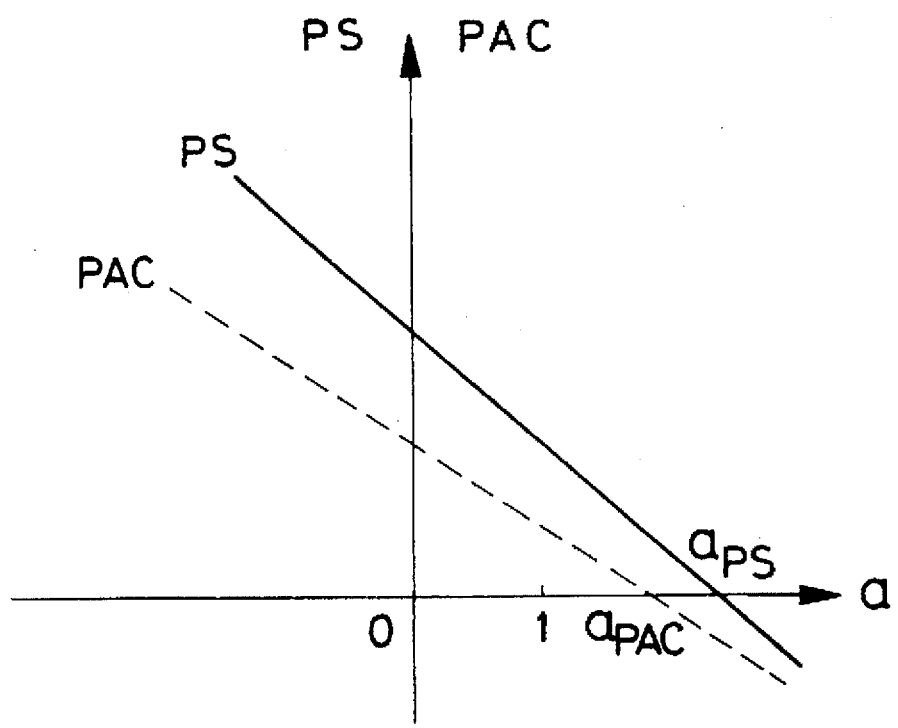
FIG. 7 shows a graph illustrating the relationship among a Petzval's sum, paraxial axial color and a medium of a radial type graded refractive index lens component.

The third embodiment of the present invention has a composition illustrated in FIG. 3, wherein the objective lens system for microscopes according to the present invention consists, in order from the object side, of a first lens component having a positive refractive power and a second lens component having a positive refractive power. Each of the first lens component and the second lens component is a graded refractive index lens component, and the objective lens system satisfies the condition (1) so as to have the large numerical aperture. Further, each of the first lens component and the second lens component satisfies the conditions (2) through (5), whereas only the first lens component having the positive refractive power satisfies the conditions (6) through (8) and has a shape of a negative meniscus lens component having a concave surface on the object side. Furthermore, the second lens component is disposed symmetrically with the first lens component with regard to a point 3 at which an offaxial principal ray intersects with an optical axis 2 when an entrance pupil is located at infinite distance, whereby effects similar to those of the first embodiment are obtained in the third embodiment. Moreover, aberrations are corrected favorably in the third embodiment though the third embodiment has a magnification and a numerical aperture which are higher and larger than those of the first embodiment. In particular, spherical aberration is corrected favorably by designing the third embodiment using an additional term of a higher order $N_{30}$ of a radial graded refractive index lens component though the third embodiment has the NA of 0.7 which is far larger than that of the first embodiment or the second embodiment. Aberration characteristics of the third embodiment are visualized in FIG. 6.

As is understood from the foregoing description, the objective lens system for microscopes according to the present invention is configured so as to have a numerical aperture of 0.2 or larger, consists of lens components in a number as small as 2 and has aberrations favorably corrected.

I claim:

1. An objective lens system for a microscope comprising, in order from an object side:

a first lens component; and a second lens component;

each of said first lens component and said second lens component being a radial type graded refractive index lens component having a refractive index distribution $N(r)$ satisfying the following condition:

$$N(r)=N_{00}+N_{10}r^2+N_{20}r^4+$$

said reference symbol r representing a distance as measured from an optical axis in a radial direction, said reference symbol $N_{00}$ representing a refractive index of said lens component as measured on said optical axis thereof, and said reference symbols $N_{10}$, $N_{20}$, ... denoting refractive index distribution coefficients of second, fourth, ... orders respectively;

said first lens component being disposed on the most object side in said lens system;

said first lens component and said second lens component each satisfying the following condition (1), and said first lens component further satisfying the following conditions (2) and (7):

$$\phi_1/\phi_2 > 1 \tag{1}$$

$$N_{10} < 0 \tag{2}$$

$$-0.05 < 1/V_{10} < 1/V_{00} \tag{7}$$

said reference symbols $\phi_1$ and $\phi_2$ represent refractive powers of said first lens component and said second lens component, respectively, and said reference symbols $V_{00}$ and $V_{10}$ represent Abbe's numbers which are determined by the following formulas:

$$V_{00}=(N_{00d}-1)/(N_{00F}-N_{00C})$$

$$V_{10}=N_{10d}/(N_{10F}-N_{10C})$$

wherein said reference symbols $N_{00d}$, $N_{00F}$ and $N_{00C}$ represent refractive indices for the d-line, F-line and C-line, respectively, as measured on said optical axis, and said reference symbols $N_{10d}$, $N_{10F}$ and $N_{10C}$ represent the second order refractive index distribution coefficients for the d-line, F-line and C-line, respectively.

2. An objective lens system for a microscope according to claim 1, wherein:

said first lens component has a concave surface on an objective side.

3. An objective lens system for a microscope according to claim 1, wherein:

said first lens component has a convex surface on an image side.

4. An objective lens system for a microscope according to claim 1, wherein:

said first lens component has a meniscus shape.

5. An objective lens system for a microscope according to claim 4, wherein said second lens component satisfies the following condition (7):

$$-0.05 < 1/V_{10} < 1/V_{00} \tag{7}$$

6. An objective lens system for a microscope according to claim 5, wherein said second lens component satisfies the following condition (2):

$$N_{10} < 0 \tag{2}$$

7. An objective lens system for a microscope according to claim 4, wherein:

said first lens component further satisfies the following condition (8):

$$\phi_s < 0 \tag{8}$$

wherein said reference symbol $\phi_s$ represents a refractive power of a surface of said first graded refractive index lens component.

8. An objective lens system for a microscope according to claim 6, wherein:

said second lens component further satisfies the following condition (8):

$$\phi_s < 0 \tag{8}$$

wherein said reference symbol $\phi_s$ represents a refractive power of a surface of said second graded refractive index lens component.

9. An objective lens system for a microscope consisting of, in order from an object side:

a first lens component; and a second lens component;

each of said first lens component and said second lens component being a radial type graded refractive index lens component having a refractive index distribution $N(r)$ satisfying the following condition:

$$N(r)=N_{00}+N_{10}r^2+N_{20}r^4+$$

said reference symbol r representing a distance as measured from an optical axis in a radial direction, said reference symbol $N_{00}$ representing a refractive index of a respective one of said first lens component and said second lens component as measured on said optical axis thereof, and said reference symbols $N_{10}$, $N_{20}$, ... denoting refractive index distribution coefficients of second, fourth, ... orders respectively;

said first lens component and said second lens component each satisfying the following condition (1), and said first lens component further satisfying the following conditions (2) and (7):

$$\phi_1/\phi_2 > 1 \tag{1}$$

$$N_{10} < 0 \tag{2}$$

$$-0.05 < 1/V_{10} < 1/V_{00} \tag{7}$$

said reference symbols $\phi_1$ and $\phi_2$ represent refractive powers of said first lens component and said second lens component, respectively, and said reference symbols $V_{00}$ and $V_{10}$ represent Abbe's numbers which are determined by the following formulas:

$$V_{00}=(N_{00d}-1)/(N_{00F}-N_{00C})$$

$$V_{10}=N_{10d}/(N_{10F}-N_{10C})$$

wherein said reference symbols $N_{00d}$, $N_{00F}$ and $N_{00C}$ represent refractive indices for the d-line, F-line and C-line, respectively, as measured on said optical axis, and said reference symbols $N_{10d}$, $N_{10F}$ and $N_{10C}$ represent second order refractive index distribution coefficients for the d-line, F-line and C-line, respectively.

10. An objective lens system for a microscope according to claim 9, wherein said first lens component satisfies the condition (4):

$$|N_{10}/f^2|>0.1\times10^{-5} \tag{4}$$

wherein said reference symbol f represents a focal length of said objective lens system as a whole.

11. An objective lens system for a microscope according to claim 9, wherein said first lens component satisfies the following condition (5):

$$d/f>0.1 \tag{5}$$

wherein said reference symbol d represents a thickness of said first lens component and said reference symbol f represents a focal length of said objective lens system as a whole.

12. An objective lens system for a microscope according to claim 9, wherein said first lens component satisfies the following condition (6):

$$N_{20}>0 \tag{6}$$

13. An objective lens system for a microscope according to claim 9, wherein said first lens component satisfies the following condition (8):

$$\phi_s<0 \tag{8}$$

wherein said reference symbol $\phi_s$ represents a refractive power of a surface of said first graded refractive index lens component.

14. An objective lens system for a microscope according to claim 9, wherein said second lens component satisfies the condition (2):

$$N_{10}<0 \tag{2}$$

15. An objective lens system for a microscope according to claim 9, wherein said second lens component satisfies the condition (4):

$$N_{10}/f^2>0.1\times10^{-5} \tag{4}$$

said reference symbol f representing a focal length of said objective lens system as a whole.

16. An objective lens system for a microscope according to claim 9, wherein said second lens component satisfies the following condition (5):

$$d/f>0.1 \tag{5}$$

wherein said reference symbol d represents a thickness of said second lens component and said reference symbol f represents a focal length of said objective lens system as a whole.

17. An objective lens system for a microscope according to claim 9, wherein said second lens component satisfies the following condition (6):

$$N_{20}>0 \tag{6}$$

18. An objective lens system for a microscope according to claim 9, wherein said second lens component satisfies the following condition (7):

$$-0.05<1/V_{10}<1/V_{00} \tag{7}$$

19. An objective lens system for a microscope according to claim 9, wherein said second lens component satisfies the following condition (8):

$$\phi_s<0 \tag{8}$$

wherein said reference symbol $\phi_s$ represents a refractive power of a lens surface of said second graded refractive index lens component.

20. An objective lens system for a microscope according to claim 9, wherein:

said first lens component has a meniscus shape whose concave surface faces an object side.

* * * * *